June 9, 1925.  1,541,063
A. E. NORRIS
BRAKE MECHANISM
Filed Oct. 26, 1922
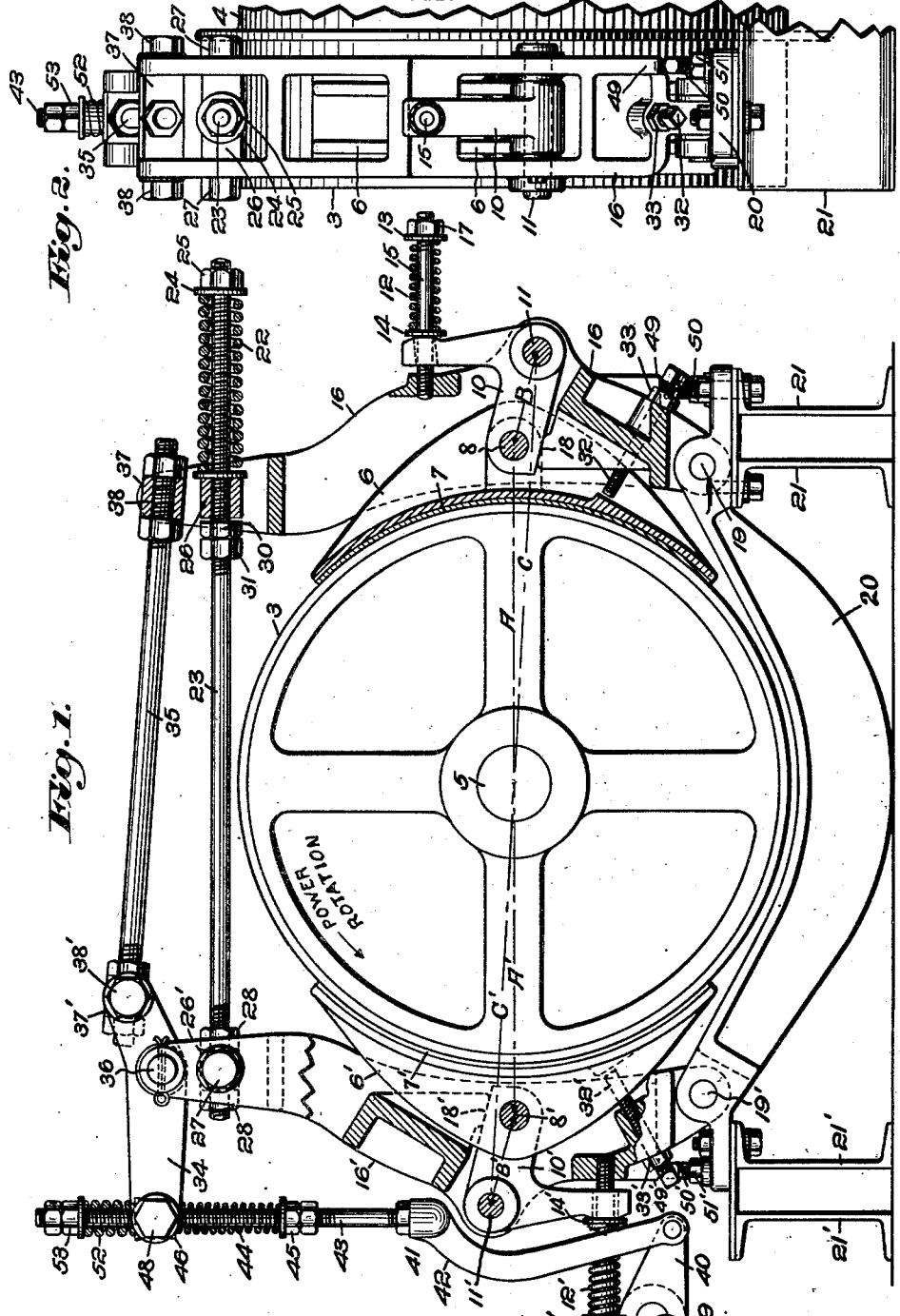
Inventor:
Almon E. Norris
by Emery, Booth, Janney & Varney
Attys.

Patented June 9, 1925.

1,541,063

UNITED STATES PATENT OFFICE.

ALMON E. NORRIS, OF BROOKLINE, MASSACHUSETTS.

BRAKE MECHANISM.

Application filed October 26, 1922. Serial No. 597,027.

*To all whom it may concern:*

Be it known that I, ALMON E. NORRIS, a citizen of the United States, and a resident of Brookline, in the county of Norfolk and State of Massachusetts, have invented an Improvement in Brake Mechanisms, of which the following description, in connection with the accompanying drawings, is a specification, like characters on the drawings representing like parts.

This invention aims to provide an improved brake mechanism which shall be capable of permitting rotation of the brake drum in one direction while normally resisting or preventing its rotation in the opposite direction. Another aim is to provide means at will to release the brake to permit rotation in said opposite direction, as well as means to supplement the automatic application of the brake by pressure applied by the operator.

The invention will be best understood by reference to the following description, when taken in connection with the accompanying drawings of one specific embodiment thereof, while its scope will be more particularly pointed out in the appended claims.

In the drawings:

Fig. 1 is an end elevation, partly in vertical section, of a brake mechanism exemplifying the invention; and Fig. 2 is a side elevation of the same as viewed from the right-hand side of Fig. 1.

Referring to the drawings, and to the embodiment of the invention which is selected for exemplification, there is shown a brake mechanism comprising a brake drum 3, herein conveniently formed as a part of a rope-winding drum 4 (see Fig. 2), the same being mounted on a shaft 5, which in practice will be journaled in suitable bearings not herein shown. In the present example, the brake comprises two brake-shoes 6 and 6', herein provided with facings 7 and 7', said shoes being mounted on pivots 8 and 8' carried by levers 10 and 10', which are fulcrumed on pivots 11 and 11'. The normal direction of rotation of the drum by power is contraclockwise, as viewed in Fig. 1, and the pivots 8 and 11 and 8' and 11' are so arranged as to permit such rotation, but normally to prevent or to resist rotation clockwise as viewed in Fig. 1. Herein, this is conveniently accomplished by arranging the levers 10 and 10' so that when the drum tends to rotate clockwise, the pivots 8 and 8' approach the brake-drum, and the brake-shoes are urged against the brake-drum. The arrangement of the levers, the brake-drum and the brake-shoes, provides a toggle effect which is graphically represented in the drawings by the lines A, B, and C, and the lines A', B', and C' in Fig. 1. Taking one side of the center as an example, the lines A and B may be taken to represent two links of a toggle, and the line C a straight line representing a plane containing the axes of the shaft 5 and the fulcrum 11. When the brake-drum rotates contraclockwise as viewed in Fig. 1, the drag on the brake-shoe tends to carry the pivot 8 in the direction of rotation away from the plane represented by the line C, but when the drum tends to rotate clockwise, the drag of the shoe on the drum causes the pivot to approach said plane, and thereby to urge the shoe against the drum, and resisting or preventing further rotation thereof, the degree of resistance, of course, depending upon the adjustment of the applying means now to be described.

In the present embodiment, means are provided normally tending to urge the brake-shoes toward the drum, but yieldingly to resist movement in the opposite direction, said means herein comprising springs 12 and 12', interposed between abutments 13 and 13', and abutments 14 and 14', the latter directly cooperating with the levers 10 and 10', respectively, and constantly assisting gravity in tending to urge the levers inward toward the brake-drum. In installations where the mechanism is upright, as in the drawings, it is found possible to eliminate the spring 12 and the immediately related parts, and to rely upon gravity alone to carry the lever 10 downward. In the present example, these springs are conveniently coiled about rods 15 and 15', which are fixedly mounted in supports presented by generally upright levers 16 and 16', into which the rods are threaded. Adjustment of the spring pressure may be effected by the use of nuts 17 and 17', threaded onto the rods to vary the positions of the abutments 13. Movement of the levers 10 and 10' under the influence of their respective springs may be limited by stops, herein abutments 18 and 18', conveniently formed on the levers 16 and 16', respectively.

The levers 16 and 16' are fulcrumed on suitable supports, herein pivots 19 and 19', on a yoke-like bracket 20, which is secured to an appropriate foundation, such as that which herein is presented by two pairs of channel-irons 21 and 21'. The yoke-like bracket serves as a tie-piece to prevent the sides of the foundation from spreading apart.

The normal pressure of the brake-shoes against the brake-drum is conveniently afforded by the use of an adjustable brake-applying spring 22, so connected to the levers 16 and 16' as to equalize the pressures of the two shoes on opposite sides of the brake-drum, as by the use of an equalizing rod 23, about which the spring is coiled. This spring rests at one end against an abutment 24, adjustably fixed on the rod as by a nut 25, and at its other end against an abutment 26, which is arranged loosely about the rod to slide lengthwise of the latter. The block is conveniently pivoted on the lever by being mounted on pivots presented by studs 27, which extend through opposite sides of the lever 16, which is bifurcated to receive the block. Likewise, the other end of the rod is received in a block 26', which is pivoted in like manner on studs 27' on the lever 16', but in this case, the rod is restrained against lengthwise movement by the use of nuts 28 threaded onto the rod and resting against opposite sides of the block.

It should now be evident that the brake-applying spring 22, on the one hand, tends to move the rod 23 and the lever 16' toward the right, and thereby to urge the brake-shoe 6' toward the brake-drum, and on the other hand, the spring tends to urge the block 26 and lever 16 toward the left, thereby urging the brake-shoe 6 against the brake-drum. Movement of the levers 16 and 16' toward each other, under the influence of the spring 22, may be limited by a suitable stop, herein conveniently presented by a nut 30 threaded onto the rod 23, and a check-nut 31, also threaded onto the rod. This stop may be normally separated from the block 26 by a slight clearance space. When, in the automatic release of the brake by rotation of the drum in the direction of the arrow in Fig. 1, the brake-shoes tend to recede from the drum, the stop 30 limits the inward swing of the levers 16 and 16', which would otherwise take place under the influence of the spring 22, and which would prevent proper release of the brake.

Rocking movement of the brake-shoes with relation to the levers which carry them may be limited by appropriate stops, herein screws 32 and 32' threaded into the levers 16 and 16', respectively, and provided with lock-nuts 33 and 33'. In practice, it is found that satisfactory results are obtained by omitting the lever 10', and its spring 12', and by pivoting the brake-shoe 6' directly upon the lever 16'.

Under some circumstances, it is desirable to employ the brake mechanism simply as an automatic brake adjusted to permit the load to be hoisted, and then to be lowered at a speed determined by the adjustment of the applying spring, in which case the brake merely resists, but does not altogether prevent reverse rotation of the drum when the application of power is discontinued. When, on the other hand, the brake is adjusted automatically to prevent reverse rotation of the drum when the power is cut off, release of the brake at the will of the operator to permit rotation of the brake-drum in a clockwise direction, as viewed in Fig. 1, may be accomplished by the use of a releasing mechanism connected to the levers 16 and 16' to move them apart in opposition to the yielding resistance presented by the applying spring 22. In the present example, I have provided for this purpose a toggle comprising a lever 34 and a link 35, one fulcrumed on a pivot 36 carried by the lever 16', and the other being pivoted at one end to the lever 34 and at its other end to the lever 16. In the present embodiment, these pivotal connections are similar to those previously described in connection with the equalizing rod 23, and comprise blocks 37 and 37' mounted on pivots presented by studs 38 and 38'.

It should now be evident that, by rocking the lever 34 in a clockwise direction about its fulcrum 36, as viewed in Fig. 1, the toggle is caused to spread the levers 16 and 16' apart in opposition to the yielding pressure presented by the applying spring 22. In some cases, it may be desirable for the operator to lock the brake in its released position, as for example when he wishes both hands free to arrange a cable on the drum 4. This is conveniently accomplished in the present example by the use of the toggle, which can be moved to a straight line position, that is to say, one in which the axes of the pivots 36, 38 and 38' lie in a plane.

The mechanism for actuating the toggle to effect the release and reapplication of the brake will now be described, reference being had to the left-hand portion of Fig. 1. A rock-shaft 39 carries an arm 40, which is connected by a link 41 to the lever 34, the link in this example comprising a fork 42 and a rod 43. The release of the brake may be, and herein is, effected through the intervention of a releasing spring 44 interposed between the link 41 and the lever 34, as by arranging the spring about the rod with one of its ends resting against an adjustable abutment afforded by a nut 45 threaded onto the rod, and its other end resting against an abutment presented by a block 46, which is loosely mounted on the rod and is pivoted to the lever as by studs 48. When, now, the rock-shaft 39 is rotated contraclockwise, as viewed in Fig. 1, the link 41 is raised, and pressure is applied to the releasing spring 44, thereby causing the brake to be released with a delicacy and fineness of control which would be impossible except for the intervention of the releasing spring. Final separation of the levers 16 and 16' is equalized by appropriate stops, herein lugs 49 and 49' conveniently formed on the levers, respectively, and adapted to abut against stop screws 50 and 50' adjustably threaded into the bracket 20, and provided with lock-nuts 51 and 51', respectively.

If desired, means may be provided to supplement the automatic application of the brake by additional spring pressure applied by the operator, as by the use of a heavy spring 52 encircling the rod 43, bearing at one end against the block 46 and at its other end against an adjustable abutment afforded by a nut 53 threaded onto the rod. If, when the load is being held suspended by the automatic application of the brake, the latter should slip, additional spring pressure may be applied by turning the rock-shaft 39 in a clockwise direction, as viewed in Fig. 1, thereby drawing the levers 16 and 16' toward each other through the intervention of the pressure of the spring 52, until further movement is prevented by the stop 30.

Having thus described one embodiment of the invention, but without limiting myself thereto, what I claim and desire by Letters Patent to secure is:

1. In a brake mechanism, the combination of a brake-drum, a friction brake therefor, means cooperating with said brake normally to permit rotation of said brake-drum in one direction but to resist rotation in the opposite direction, and means for moving the first-mentioned means bodily at will to permit rotation in said opposite direction.

2. In a brake mechanism, the combination of a brake-drum, a friction brake therefor, means supporting and cooperating with said brake to permit rotation of said brake-drum in one direction but to resist rotation in the opposite direction, and means for moving the first-mentioned means bodily at will to permit rotation in said opposite direction.

3. In a brake mechanism, the combination of a brake-drum, a friction brake therefor, means supporting and cooperating with said brake to permit rotation of said brake-drum in one direction but to resist rotation in the opposite direction, and means supporting the first-mentioned means and for causing the same at will to permit rotation in said opposite direction.

4. In a brake mechanism, the combination of a brake-drum, a friction brake therefor, means including a lever cooperating with said brake normally to permit rotation of said brake-drum in one direction but to resist rotation in the opposite direction, and means including a lever for moving the first-mentioned lever bodily to permit rotation in said opposite direction.

5. In a brake mechanism, the combination of a brake-drum, a friction brake therefor, means including a lever cooperating with said brake and brake-drum to provide a toggle effect normally to permit rotation of said brake-drum in one direction but to resist rotation in the opposite direction, and means including a lever affording a fulcrum for the first-mentioned lever to move the latter bodily to permit rotation of said brake-drum in said opposite direction.

6. In a brake mechanism, the combination of a brake-drum, a friction brake therefor, means including a lever and a spring normally to permit rotation of said brake-drum in one direction in opposition to the resistance of said spring, said lever under the influence of said spring resisting rotation of said drum in the opposite direction, and means to move said lever bodily to permit rotation of said brake-drum in said opposite direction.

7. In a brake mechanism, the combination of a brake-drum, a friction brake therefor, means including a lever and a spring normally to permit rotation of said brake-drum in one direction in opposition to the resistance of said spring, said lever under the influence of said spring resisting rotation of said drum in the opposite direction, a second lever by which the first-mentioned lever is carried bodily to permit rotation of said brake-drum in said opposite direction, and a second spring by which said second lever is caused normally to urge said brake against said brake-drum.

8. In a brake mechanism, the combination of a brake-drum, a friction brake therefor, means cooperating with said brake normally to yield and to permit rotation of said brake-drum in one direction but to urge said brake against said drum when the latter tends to rotate in the opposite direction, means presenting a support for the first-mentioned means, and means for moving said support to carry the first-mentioned means bodily to permit rotation of said brake-drum in said opposite direction.

9. In a brake mechanism, the combination of a brake-drum, a friction brake therefor, means comprising a lever carrying said brake and a spring cooperating with said lever normally to yield and to permit rotation of said brake-drum in one direction but to urge said brake against said drum when the latter tends to rotate in the opposite direction, a lever presenting a support for the first-mentioned lever, and a brake-applying spring normally urging the second-mentioned lever in a direction to carry said brake toward said brake-drum.

10. In a brake mechanism, the combination of a brake-drum, a friction brake therefor, means cooperating with said brake normally to yield and to permit rotation of said brake-drum in one direction but to urge said brake against said drum when the latter tends to rotate in the opposite direction, means presenting a support for the first-mentioned means, and means including a releasing spring for moving said support to permit rotation of said brake-drum in said opposite direction.

11. In a brake mechanism, the combination of a brake-drum, two oppositely disposed, friction brake shoes therefor, means cooperating with each of said shoes normally to yield and to permit rotation of said brake-drum in one direction but to urge said shoes against said drum when the latter tends to rotate in the opposite direction, means presenting supports for the first-mentioned means, and means for moving said supports to carry the first-mentioned means bodily to permit rotation of said brake-drum in said opposite direction.

12. In a brake mechanism, the combination of a brake-drum, two oppositely disposed, friction brake shoes therefor, means cooperating with each of said shoes normally to yield and to permit rotation of said brake-drum in one direction but to urge said shoes against said drum when the latter tends to rotate in the opposite direction, means presenting supports for the first-mentioned means, and means including a toggle for moving said supports to permit rotation of said brake drum in said opposite direction.

13. In a brake mechanism, the combination of brake-drum, two oppositely disposed, friction brake shoes therefor, means cooperating with each of said shoes normally to yield and to permit rotation of said brake-drum in one direction but to urge said shoes against said drum when the latter tends to rotate in the opposite direction, means presenting supports for the first-mentioned means, and means at will to retain said supports in a fixed position in which rotation of said brake-drum in said opposite direction is permitted.

14. In a brake mechanism, the combination of a brake-drum, two oppositely disposed, friction brake shoes therefor, means cooperating with each of said shoes normally to yield and to permit rotation of said brake-drum in one direction but to urge said shoes against said drum when the latter tends to rotate in the opposite direction, means presenting supports for the first-mentioned means, and a toggle having provision to retain said supports in a fixed position in which rotation of said brake-drum in said opposite direction is permitted.

15. In a brake mechanism, the combination of a brake-drum, a friction brake therefor, means cooperating with said brake normally to permit rotation of said brake-drum in one direction but to resist rotation in the opposite direction, and means at will to apply another and different force to increase the degree of resistance to rotation in said opposite direction.

16. In a brake mechanism, the combination of a brake-drum, a friction brake therefor, means cooperating with said brake normally to permit rotation of said brake-drum in one direction but to resist rotation in the opposite direction, and means at will to permit rotation in said opposite direction or to apply another and different force to increase the degree of resistance to rotation in said opposite direction.

17. In a brake mechanism, the combination of a brake-drum, a brake-shoe cooperating therewith, a lever carrying said brake-shoe and cooperating therewith to resist rotation of said brake-drum in one direction while permitting relatively free rotation of said drum in the opposite direction, and a second lever by which the first-mentioned lever is carried bodily to permit relatively free rotation of said brake-drum in the first-mentioned direction.

18. In a brake mechanism, the combination of a brake-drum, a brake-shoe cooperating therewith, means carrying said brake-shoe and cooperating therewith to resist rotation of said brake-drum in one direction, while permitting relatively free rotation of said drum in the opposite direction, and other means by which the first-mentioned means is carried bodily to permit relatively free rotation of said brake-drum in the first-mentioned direction.

19. In a brake mechanism, the combination of a brake-drum, a friction brake therefor, means cooperating with said brake normally to permit rotation of said brake-drum in one direction but to resist rotation in the opposite direction, a support for said means, means yieldingly urging said support toward said brake-drum, and means for moving said support from said brake-drum.

20. In a brake mechanism, the combination of a brake-drum, a friction brake therefor, means cooperating with said brake normally to permit rotation of said brake-drum in one direction but to resist rotation in the opposite direction, a support for said means, means yieldingly urging said support toward said brake-drum, means to limit movement of said support toward said brake-drum, and means for moving said support from said brake-drum.

21. In a brake mechanism, the combination of a brake-drum, a friction brake therefor, means cooperating with said brake normally to permit rotation of said brake-drum in one direction but to resist rotation in the opposite direction, and means for moving the first-mentioned means bodily in a generally radial direction from said brake-drum.

22. In a brake mechanism, the combination of a brake-drum, a friction brake therefor, means cooperating with said brake normally to permit rotation of said brake-drum in one direction but to resist rotation in the opposite direction, means to limit the brake applying movement of the first-mentioned means, and means for moving the first-mentioned means to permit rotation in said opposite direction.

23. In a brake mechanism, the combination of a brake-drum, a friction brake therefor, means cooperating with said brake normally to permit rotation of said brake-drum in one direction but to resist rotation in the opposite direction, and a support for said means, presenting means to limit brake-applying movement of said means.

24. In a brake mechanism, the combination of a brake-drum, a friction brake therefor, brake applying means cooperating with said brake normally to permit rotation of said brake-drum in one direction, but to resist rotation in the opposite direction, and auxiliary brake-applying means adapted to be brought into effect by intervention of the operator to cause said brake to be applied with a greater degree of force than that which is afforded by the first-mentioned brake-applying means.

25. In a brake mechanism, the combination of a brake-drum, a friction brake therefor, brake-applying means including a device furnishing a force normally urging said brake toward said drum but adapted automatically to yield in response to rotation of said drum in one direction only to decrease resistance to such rotation, and normally ineffective, auxiliary brake-applying means including a device adapted to be rendered effective by the operator to furnish another force to urge said brake toward said drum.

26. In a brake mechanism, the combination of a brake-drum, a friction brake therefor, brake-applying means including a device furnishing a force normally urging said brake toward said drum but adapted automatically to yield in response to rotation of said drum in one direction only to decrease resistance to such rotation, and normally ineffective, auxiliary brake-applying means including a spring, and means at will to stress said spring to apply another force to urge said brake toward said drum.

27. In a brake mechanism, the combination of a brake-drum, a friction brake therefor, means cooperating with said brake normally to permit rotation of said brake-drum in one direction but to resist rotation in the opposite direction, a support for said means, means yieldingly urging said support toward said brake-drum, and means at will to move said support to urge said brake toward said drum.

28. In a brake mechanism, the combination of a brake-drum, a friction brake therefor, means cooperating with said brake normally to permit rotation of said brake-drum in one direction but to resist rotation in the opposite direction, a support for said means, means yieldingly urging said support toward said brake-drum, and instrumentalities including a spring, and means at will to stress said spring to apply another force through said spring to urge said brake toward said drum.

29. In a brake mechanism, the combination of a brake-drum, a friction brake therefor, means cooperating with said brake normally to permit rotation of said brake-drum in one direction but to resist rotation in the opposite direction, a support for said means, means constantly tending to urge said support in a direction to cause said brake to be urged toward said drum with a yielding pressure, and means at will to urge said support in such direction with another yielding pressure.

30. In a brake mechanism, the combination of a brake-drum, a friction brake therefor, means cooperating with said brake normally to permit rotation of said brake-drum in one direction but to resist rotation in the opposite direction, a support for said means, a normally effective spring constantly tending to urge said support in a brake-applying direction, a normally ineffective brake-applying spring, and means at will to render said normally ineffective spring effective to urge said support in a brake-applying direction.

In testimony whereof, I have signed my name to this specification.

ALMON E. NORRIS.